United States Patent
Davis

(10) Patent No.: US 12,353,208 B2
(45) Date of Patent: Jul. 8, 2025

(54) SYSTEM AND METHOD FOR OPTIMIZED PERCEPTION SENSING IN A WORK AREA USING VIRTUAL PERIMETERS

(71) Applicant: Deere & Company, Moline, IL (US)

(72) Inventor: Travis J. Davis, Polk City, IA (US)

(73) Assignee: Deere & Company, Moline, IL (US)

( * ) Notice: Subject to any disclaimer, the term of this patent is extended or adjusted under 35 U.S.C. 154(b) by 239 days.

(21) Appl. No.: 17/967,167

(22) Filed: Oct. 17, 2022

(65) Prior Publication Data

US 2024/0126260 A1    Apr. 18, 2024

(51) Int. Cl.
  *G05D 1/00*    (2024.01)
(52) U.S. Cl.
  CPC ......... *G05D 1/0094* (2013.01); *G05D 1/0214* (2013.01); *G05D 1/0223* (2013.01)
(58) Field of Classification Search
  CPC .......... E02F 9/2054; E02F 9/262; E02F 9/24; G06Q 10/04; G06Q 50/08; G06Q 10/063; G06Q 50/02; G05D 1/0223; G05D 1/0094; G05D 1/0214
  See application file for complete search history.

(56) References Cited

U.S. PATENT DOCUMENTS

| | | | |
|---|---|---|---|
| 7,612,668 B2 | 11/2009 | Harvey | |
| 8,996,171 B2 | 3/2015 | Anderson et al. | |
| 2020/0005613 A1* | 1/2020 | Yuan | G06V 40/10 |
| 2021/0097839 A1* | 4/2021 | Hageman | G01S 13/87 |
| 2021/0246631 A1* | 8/2021 | Kurosawa | G06V 40/113 |
| 2021/0373526 A1* | 12/2021 | Hammes | G05B 19/406 |
| 2022/0170242 A1* | 6/2022 | Maley | G06T 7/70 |

FOREIGN PATENT DOCUMENTS

| | | |
|---|---|---|
| EP | 3800905 A1 | 4/2021 |
| EP | 4012120 A1 | 6/2022 |

OTHER PUBLICATIONS

Extended European Search Report and Written Opinion issued in European Patent Application No. 23201861.4, dated Feb. 29, 2024, in 07 pages.

* cited by examiner

*Primary Examiner* — Stephen Holwerda
(74) *Attorney, Agent, or Firm* — Gary L. Montle; Lucian Wayne Beavers; Patterson Intellectual Property Law, PC

(57) ABSTRACT

A system and method are provided for distributed perception sensing via an object detection station arranged such that an associated one or more object detection sensors have respective fields of perception including at least a portion of a virtually defined perimeter extending at least partially about a working area. The object detection station detects a motion incident corresponding to a violation of the virtually defined perimeter, wherein a detected source of the motion incident is classified with respect to one or more defined source types, and one or more signals at least corresponding to the motion incident are wirelessly communicated to one or more working machines operating within the working area. At least one of the working machines may then be selectively transitioned from a normal operating mode to a hierarchical intervention mode with respect to the detected source and/or a relative position thereof within the working area.

18 Claims, 3 Drawing Sheets

SYSTEM AND METHOD FOR OPTIMIZED PERCEPTION SENSING IN A WORK AREA USING VIRTUAL PERIMETERS

FIELD OF THE DISCLOSURE

The present disclosure relates generally to work machines, and more particularly to systems and methods for optimizing perception sensing, such as for example object detection sensitivity, for work machines in a work area using virtual perimeters.

BACKGROUND

Work machines as discussed herein may generally refer to tractors, tracked excavators, or other agricultural and/or forestry machines for illustrative purposes, but may further include any of various work machines having object detection sensing capabilities or relying on external object detection sensing, for example to avoid obstacles or safety hazards and the like in a work area.

Object detection systems are of particular importance for autonomous work machines, conventional examples of which unfortunately are prone to frequent unnecessary interventions or forced stops due to detected "possible" objects that turn out to be false positives. It has further been found that work areas having a standing crop are more challenging for autonomous operation in this context than tillage use cases.

It would accordingly be desirable to operate work machines in a more optimized fashion such that an object detection system associated with the work machine does not have to be able to sense motion within the entirety of the work area at all times, thereby potential preserving resources by only selectively implementing long range use of the local object detection system and further reducing the number of unnecessary and inefficient work stoppages and other interventions.

BRIEF SUMMARY

The current disclosure provides an enhancement to conventional systems, at least in part by introducing a novel system and method for generating a virtual sensing perimeter about a work area within which the work machines are operating, such as for example a construction/forestry worksite of interest. Rather than a physical fence that is non-ideal with respect to aesthetics and the hassle of installation, a virtual sensing perimeter as disclosed herein may be generated and monitored using permanent or temporary smart sensing stations that are installed at an appropriate spacing for the work area.

An array of such stations, or even just one in certain applications, may comprise a highly capable sensing solution to monitor the boundaries of a work area in case someone or something of a reasonable size enters the work area while one or more work machines are operating therein. Accordingly, various different modes of operation may be enabled for the one or more work machines. Based for example on the settings, environmental complexity, machine preferences, or the like, a work machine can be controlled to completely stop, or run in a slightly non-efficiency optimized mode in which the work machine may slow down and/or become more sensitive to object detections at the machine level.

In one embodiment, a method is disclosed of distributed perception sensing via at least one object detection station arranged such that, for each of the at least one station, an associated one or more object detection sensors have respective fields of perception including at least a portion of a virtually defined perimeter extending at least partially about a working area. The method includes detecting, via one or more of the at least one object detection station, a motion incident corresponding to a violation of the virtually defined perimeter, and classifying a detected source of the motion incident with respect to one or more defined source types. One or more signals at least corresponding to the motion incident are wirelessly communicated to one or more working machines operating within the working area, responsive to which at least one of the one or more working machines may be selectively transitioned from a normal operating mode to a hierarchical intervention mode with respect to one or more of the detected source and a relative position thereof within the working area.

In one exemplary aspect according to the above-referenced embodiment, one or more of the at least one object detection station may be portable, wherein the method comprises arranging the one or more of the at least one object detection station with respect to the at least a portion of the virtually defined perimeter.

In another exemplary aspect according to the above-referenced embodiment, the motion incident may be detected in a low-power operating mode, and the method further comprises transitioning of the one or more of the at least one object detection station into a full-power operating mode for classifying the detected source of the motion incident.

In another exemplary aspect according to the above-referenced embodiment, the step of classifying a detected source of the motion incident with respect to one or more defined source types may comprise training one or more models to correlate historical input data sets from the one or more object detection sensors with respect to user input identifying the one or more source types, receiving a current input data set corresponding to the motion incident from the one or more object detection signals as input to the one or more models, and comparing the current input data set with the historical input data sets via the one or more models to classify the detected source of the motion incident.

In another exemplary aspect according to the above-referenced embodiment, the virtually defined perimeter may be established via user input on a remote computing device and downloaded to each of the at least one object detection station.

In another exemplary aspect according to the above-referenced embodiment, the virtually defined perimeter may be dynamically established based on the arranging of the at least one object detection station and/or a current location of the one or more working machines.

In another exemplary aspect according to the above-referenced embodiment, the selective transitioning of at least one of the one or more working machines from a normal operating mode to a hierarchical intervention mode may comprise automatically selecting a responsive operation of causing the at least one working machine to stop, adjusting a speed of movement of the at least one working machine, or adjusting a range and/or sensitivity of a local object detection system for the at least one working machine.

The responsive operation may be automatically selected based on a type of the classified source of the motion incident. The responsive operation may in addition, or alternatively, be automatically selected based on environmental conditions within the working area. The responsive operation may in addition, or alternatively, be automatically selected based on a proximity between the detected source of the motion incident and the at least one working machine.

In another exemplary aspect according to the above-referenced embodiment, the one or more wirelessly communicated signals may comprise localization information for determining a location of the detected source relative to the one or more working machines.

In another exemplary aspect according to the above-referenced embodiment, the method may include determining first position data for the classified source of the motion incident in a reference frame independent of the at least one working machine, wirelessly communicating the one or more signals further corresponding to the first position data to the at least one working machine, and converting the first position data to second data in a reference frame associated with a local object detection system of the at least one work machine.

In another embodiment, a system as disclosed herein includes at least one object detection station each comprising a power source, a wireless communication transceiver, and one or more object detection sensors, and arranged such that the one or more object detection sensors have respective fields of perception including at least a portion of a virtually defined perimeter extending at least partially about a working area. At least one controller is provided for each of one or more working machines operating within the working area, and in functional communication with each of the at least one object detection station. Each of the at least one object detection station is configured to detect a motion incident corresponding to a violation of the virtually defined perimeter, classify a detected source of the motion incident with respect to one or more defined source types, and wirelessly communicate one or more signals at least corresponding to the motion incident to one or more working machines operating within the working area. Each of the at least one controller is configured responsive to the one or more signals to selectively transition the respective working machine from a normal operating mode to a hierarchical intervention mode with respect to one or more of the detected source and a relative position thereof within the working area.

The system may for example include a plurality of object detection stations each in functional communication with the one or more working machines and with each other object detection station.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
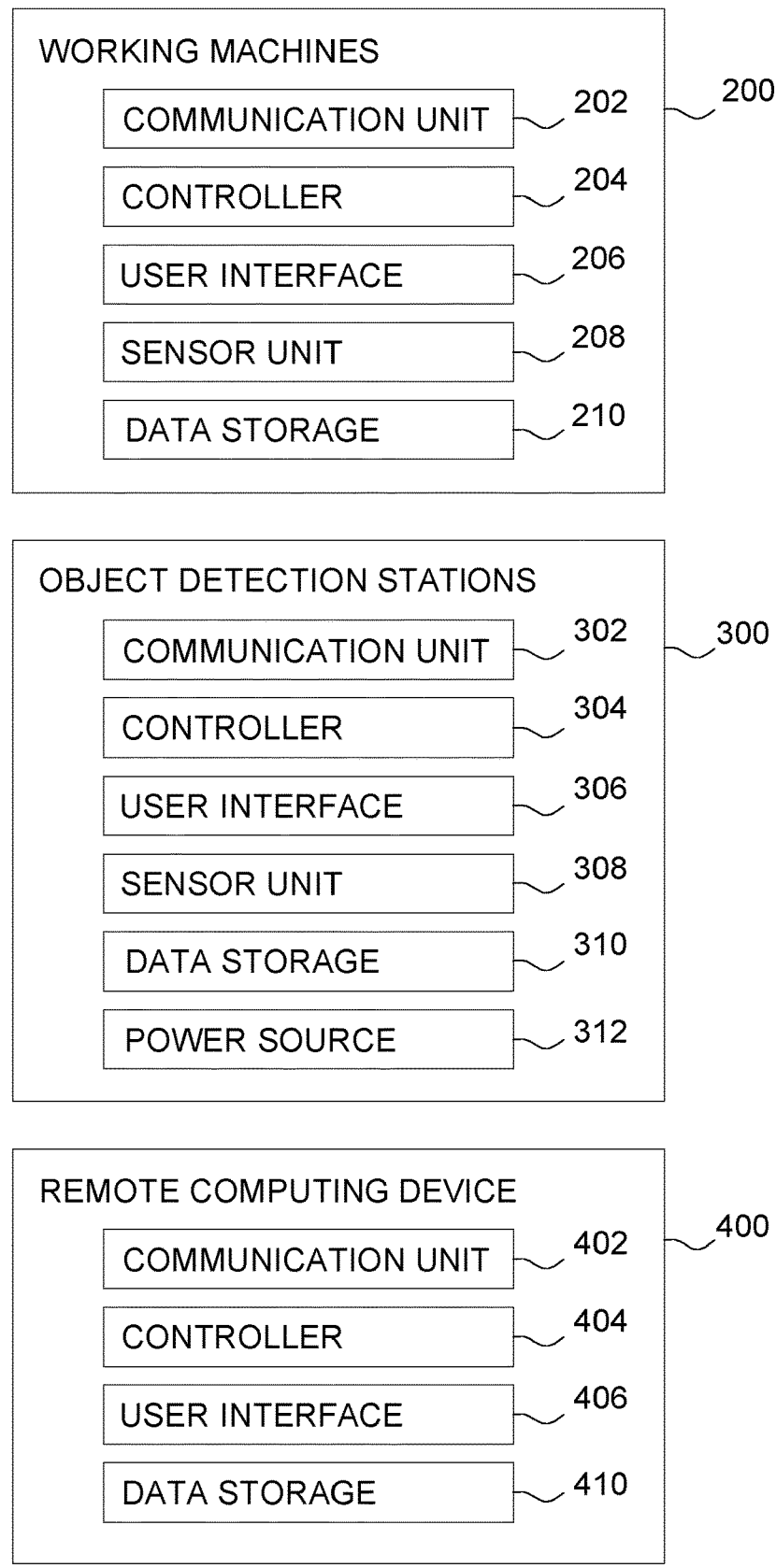
FIG. 1 is a side view of an exemplary embodiment of a system according to the present disclosure.
Figure 2:
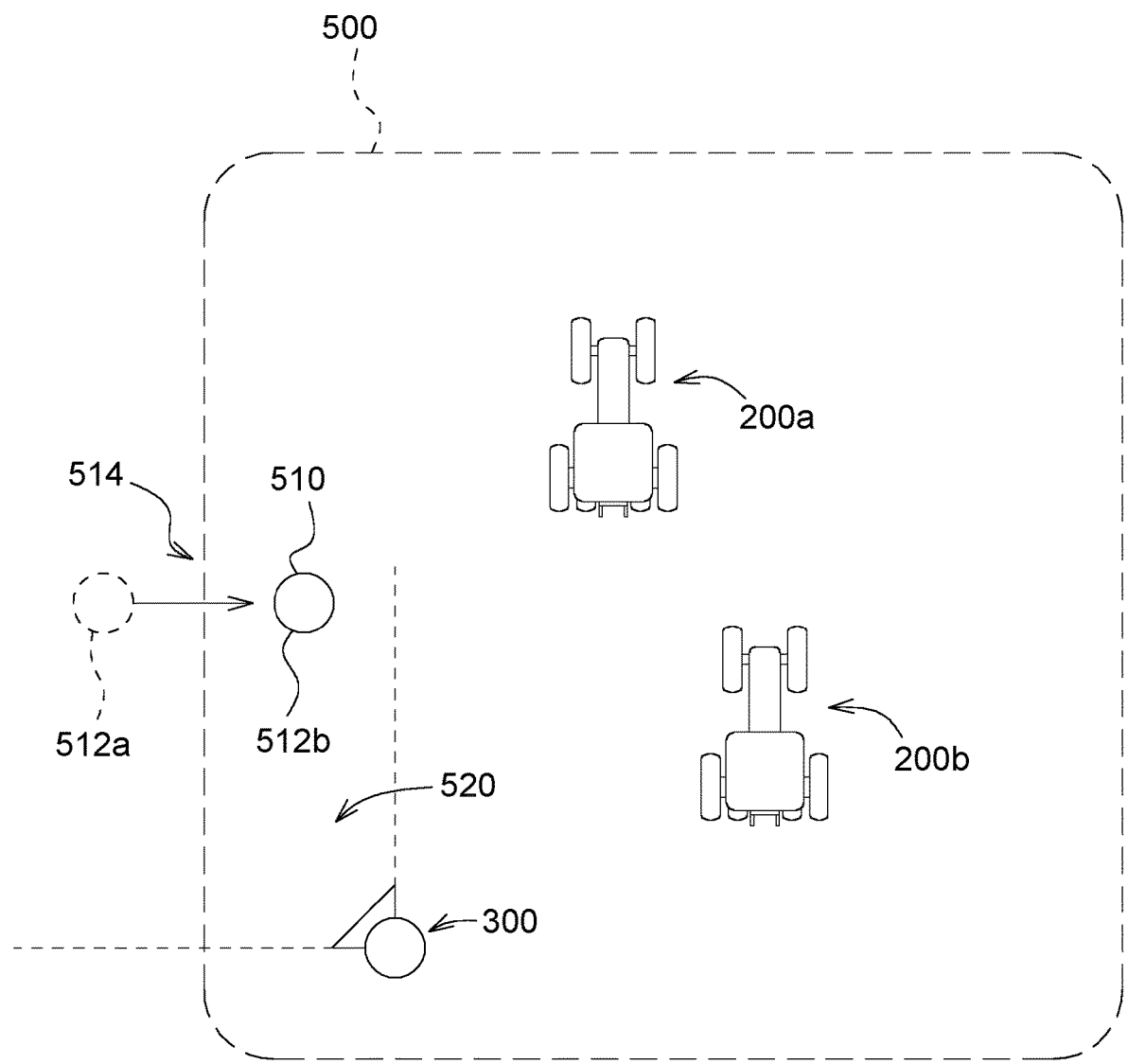
FIG. 2 represents a work area having a defined virtual perimeter in accordance with an embodiment of the present disclosure.

FIGS. 1 and 2 represent a particular embodiment of a system 100 as disclosed herein including appropriately configured elements of one or more work machines 200 in a work area, and one or more object detection stations 300 independent of the work machines 200. In an embodiment as shown, the system 100 may further include one or more remote computing devices 400 or executable applications there from which are functionally linked to the work machines 200 and/or object detection stations 300.

Such a system 100 as further described below may in some embodiments include a plurality of work machines 200a, 200b, object detection stations 300, and/or remote computing devices 400 without limitation to a particular work area or associated job, or may be selectively defined for a particular work area or associated job with respect to a subset of available work machines 200, object detection stations 300, and/or remote computing devices 400. Where some of the object detection stations 300 may be permanent in nature with respect to a given work area, for example, a system 100 may be selectively defined for a job within the given work area as including a subset of available work machines 200 assigned to the job, the permanent stations 300, optionally in addition to any portable object detection stations 300 that may be provided, etc.

A work machine 200 as disclosed herein may include any number of work machines as known in the art, but most relevant are those used in applications (e.g., agricultural, forestry, construction, etc.) including a work area that may include moving obstacles/objects that present safety hazards for the object or the machine itself. The present disclosure may be of particular importance to applications including autonomous work machines 200, but is not limited to such applications unless otherwise explicitly noted. Exemplary work machines 200 such as tractors, excavators, feller bunchers, and the like include various components and work implements which are known to those of skill in the art and are not recited in detail herein, but certain common elements which contribute to functions associated with the present disclosure are noted below.

As schematically illustrated in FIG. 1, each work machine 200 in the defined system 100 may include some or all of a communication unit 202, a control unit including for example a controller 204, a user interface 206, a sensor unit 208 for at least object detection, and a data storage unit 210.

The controller 204 may be part of a machine control system of the respective work machine 200, or it may be a separate control module. The controller 204 may be configured to receive input signals from some or all of various sensors in the sensor unit 208 such as for example one or more cameras collectively defining an imaging system. The sensor unit 208 may for example be mounted on a main frame of the work machine 200 and arranged to capture images or otherwise generate image data corresponding to surroundings of the work machine 200. The sensor unit 208 may include video cameras configured to record an original image stream and transmit corresponding data to the controller 204. In the alternative, or in addition, the sensor unit 208 may include ultrasonic scanners, high resolution light detection and ranging (LiDAR) scanners, radar wave transmitters and receivers, laser scanners, thermal sensors, structured light sensors, sensing or transmission devices that utilize various wavelengths for optimal objects or movement detections, and the like to be implemented as sensors in the sensor unit 208 within the scope of the present disclosure. The number, combinations, and orientation of said sensors may vary in accordance with the type of work vehicle 200 and relevant applications, but generally are provided and configured to optimize recognition of objects proximate to, or otherwise in association with, a determined operating area of the vehicle.

In some embodiments the sensor unit 208, and/or the controller 204 in response to input signals or data from the sensor unit 208, may include the ability to determine an object position as well as an object distance. The controller 204 may combine information about the mounting location of a particular sensor in the sensor unit 208 with the detected distance to the nearest object. In an embodiment, the controller may for example identify a particular sensor in correlation with received output signals, and selectively retrieve sensor location data from onboard data storage 210 for implementation in the distance detection step.

Alternative implementations within the scope of the present disclosure could use simpler near field radio communications to designate proximity, global positioning system (GPS) location signals, and the like.

Where the sensor unit 208 comprises image data sources, one of skill in the art may further appreciate that image data processing functions may be performed discretely at a given image data source if properly configured, but also or otherwise may generally include at least some image data processing by the controller 204 or other downstream data processor. For example, image data from any one or more image data sources may be provided for three-dimensional point cloud generation, image segmentation, object delineation and classification, and the like, using image data processing tools as are known in the art in combination with the objectives disclosed.

The sensor unit 208 and associated signal processing system may be referred to as a local object detection system. The local object detection system of any work machine 200 in an embodiment may be selectively adjustable so as to focus on objects within a shorter range, a medium range, or a longer range from the work machine 200, which may for example entail adjustments to the available range of one or more components of the local object detection system, but in addition or in the alternative may entail adjustments to the sensitivity of one or more components of the local object detection system. As noted elsewhere herein, it may be desirable to operate the local object detection system is as short of a range (and/or as little sensitivity) as possible without undue increases in risk, based further on inputs from the various object detection stations 300 associated with the work area in which the work machine 300 is operating.

The controller 204 of the work machine 200 may be configured to produce outputs such as for example corresponding to determined positions of detected objects to a user interface 206, for example further having or associated with a display unit for display to a human operator. The controller 204 may be configured to receive inputs from the user interface 206, such as user input provided via the user interface 206. Rather than, or in addition to, an onboard user interface 206, the controller 204 of the work machine 200 may in some embodiments further receive inputs from and generate outputs to remote devices 400 associated with a user via a respective user interface 406, for example a display unit with touchscreen interface. Data transmission between for example the work machine controller 204 and a remote device 400 may be implemented using a communication unit 202 associated with the work machine 200, a communication unit 402 and controller 404 associated with the remote device 400, and any other intermediary components which collectively may take the form of a wireless communications system and associated components as are conventionally known in the art. In certain embodiments, a remote user interface 406 and controllers 204 for respective work machines 200 may be further coordinated or otherwise interact with a remote server or other computing device for the performance of operations in a system 100 as disclosed herein.

The controller 204 may in various embodiments be configured to generate control signals for controlling the operation of respective actuators, or signals for indirect control via intermediate control units, associated with steering control, work implement control, engine speed control, and the like. The various work machine control systems may be independent or otherwise integrated together or as part of a machine control unit in various manners as known in the art. The controller 204 may for example generate control signals for controlling the operation of various actuators, such as hydraulic motors or hydraulic piston-cylinder units (not shown), and electronic control signals from the controller 204 may actually be received by electro-hydraulic control valves associated with the actuators such that the electro-hydraulic control valves will control the flow of hydraulic fluid to and from the respective hydraulic actuators to control the actuation thereof in response to the control signal from the controller 204.

The communication unit 202 as noted above may support or provide communications between the controller 204 and external communications units, systems, or devices, and/or may further support or provide communication interface with respect to internal components of the work machine 200. The communications unit 202 may include wireless communication system components (e.g., via cellular modem, WiFi, Bluetooth or the like) and/or may include one or more wired communications terminals such as universal serial bus ports.

The data storage unit 210 may be discrete or otherwise part of the work machine controller 204 or broader machine control unit, and may for example encompass hardware such as volatile or non-volatile storage devices, drives, electronic memory, and optical or other storage media, as well as in certain embodiments one or more databases residing thereon.

An object detection station 300 as disclosed herein for distributed (decentralized) object detection external to the work machines 200 themselves may include a portable housing or in various embodiments may be substantially fixed in a location. An object detection station 300a may include a communication unit 302 for facilitating data transmission between the object detection station 300 and any one or more of the work machines 200, remote computing devices 400, and any other object detection stations 300b, . . . 300x. While embodiments as described below may refer to a particular object detection station or a group of object detection stations having common functionality, it should be noted that in various embodiments within the scope of the present disclosure an array or network of object detection stations 300 may be disposed within or relative to the work area while having different components and associated system functionality, e.g., for carrying out aspects of the method 600 described below. For example, an array of object detection stations 300 within or relative to a work area may include active and/or passive detection and/or transmission, in a manner that is dictated by the structural limitations of the system components or in some cases as may be selectively specified by system controllers.

An object detection station 300 may further include a controller 304, user interface 306, sensor unit 308, data storage 310, and a power supply 312. A remote computing device 400 may further include a controller 404, user interface 406, and data storage 410.

The controller 304 for the object detection station 300 may be configured to receive input signals from some or all of various sensors in the sensor unit 308. The sensor unit 308 for an object detection station 300 may include one or more cameras arranged to capture images or otherwise generate image data corresponding to surroundings of the object detection station 300 and more particularly corresponding to a specified field 520 covering at least a portion of a defined virtual perimeter 500 as represented in FIG. 2. In the alternative or in addition, the sensor unit 308 may include LiDAR, scanners, laser scanners, ultrasonic scanners, radar wave transmitters and receivers, thermal sensors, structured light sensors, sensing or transmission devices that utilize various wavelengths for optimal objects or movement detections, and the like.

The sensor unit 308 may further include GPS transceivers or equivalent position sensors in functional communication with the controller 304 for determining a location of the object detection station 300 relative to other object detection stations 300 and to the work machines 200 in the area, further such that localization of any detected objects within the work area and/or the above-referenced virtual perimeter 500 is facilitated with respect to the other object detection stations 300 and/or the work machines 200. For example, the controller 304 for an object detection station 300 may be configured to detect a motion incident 514 and a source 510 thereof relative to a defined virtual perimeter, and further to determine position data for the detected source 510 based on one or more sensor inputs such as for example time-of-flight data and corresponding orientation data. The controller 304 may in an embodiment further transform the position data as needed into a spatial reference frame, and then transmit notification of the detected motion incident source 510 along with the position data in the spatial reference frame to at least one of the work machines 200 in the work area, for example based on a proximity determination for the detected motion incident source 510 relative to each of the work machines 200 operating in the work area. The work machine 200 in various embodiments may utilize the position data in the spatial reference frame, or may locally transform the position data into a reference frame appropriate to the object detection system of the work machine 200.

The user interface 306 for an object detection station 300 may include an onboard user interface such as a control panel for manual adjustment to settings in data storage 310, which may be supplemented or replaced by a remote user interface such as for example an interface 406 on a remote computing device 400 that is accordingly configured to receive inputs from or generate outputs to the object detection station 300.

The power supply 312 for an object detection station 300 may for example include a photovoltaic system such as solar panels, power inverters, and power storage (e.g., one or more batteries) as are known in the art. The power supply 312 may further include elements for connecting externally to a direct power supply, alone or in hybrid combination with an independent power supply such as the above-referenced photovoltaic system. The power supply 312 in association with the controller 304 may in certain embodiments be configured to operate in any one of multiple power modes. For example, in a first (low power) mode, a reduced subset of station capabilities may be enabled, whereas in a second (high power) mode the station may be configured to perform substantially all capabilities as needed. This may allow, e.g., the object detection station 300 to perform relatively simple object detection functions with respect to a virtual perimeter as further described below in the first mode, wherein the object detection station 300 transitions to the second mode for a more highly capable sensing solution to accurately determine what object or obstacle has entered the work area or otherwise triggered the initial object detection.

Generally stated, various operations, steps or algorithms as described in connection with the controllers 204, 304, 404 of the various machines and devices as disclosed above can be embodied directly in hardware, in a computer program product such as a software module executed by a processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

Figure 3:
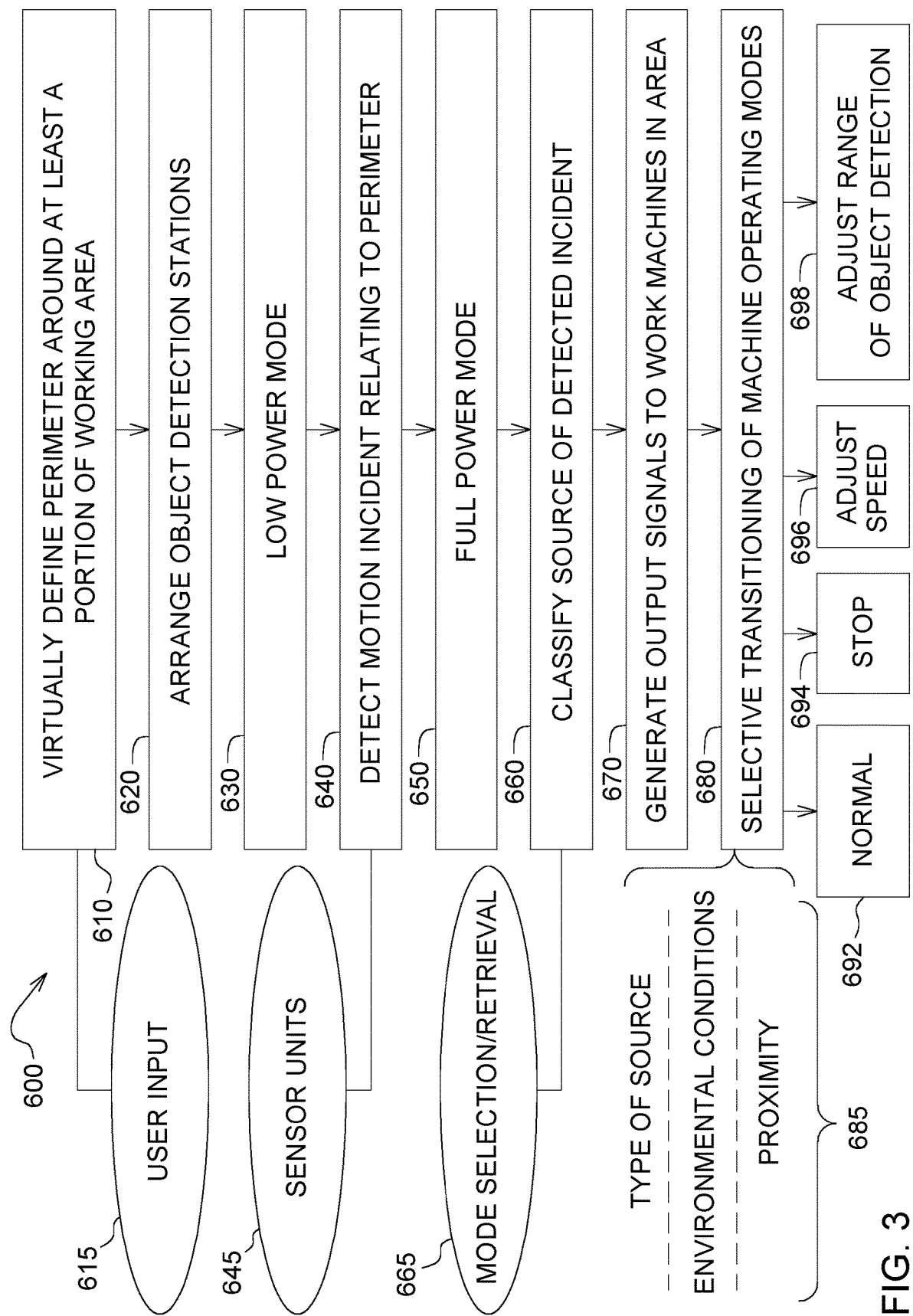
FIG. 3 is a flowchart representing an exemplary method according to an embodiment of the present disclosure.

Referring next to FIG. 3, with further illustrative reference to FIGS. 1 and 2, an embodiment of a method 600 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously.

The method 600 in an embodiment may begin in step 610 by defining a virtual perimeter 500 about, or otherwise with respect to at least a portion of, a work area. The virtual perimeter 500 may be defined according to user input 615 received via a user interface 206, 306, 406, or may be predetermined with respect to definition of the work area itself and downloaded to the respective work machines 200, object detection stations 300, and/or remote computing devices 400.

The method 600 may continue in step 620 in certain embodiments by arranging one or more object detection stations 300 with respect to the defined virtual perimeter 500, for example such that each object detection station 300 has a field of perception 520 (i.e., field of vision or equivalent) corresponding to at least a portion of the defined virtual perimeter 500 and preferably that all pertinent portions of the defined virtual perimeter 500 are covered by a respective field 520 for at least one object detection station 300. In various embodiments, some or all of the object detection stations 300 may be fixed in nature wherein the step of arranging 620 may be omitted, but further wherein the virtual perimeter 500 itself may be defined at least partially with respect to a configuration of the fixed object detection stations 300.

In an embodiment, the above steps 610 and 620 may overlap as the virtual perimeter 500 may be dynamically determined based upon a chosen arrangement of the object detection stations 300 themselves, or in other words that the virtual perimeter 500 may correspond in some manner to the respective fields of perception 520 for the available object detection stations 300 in the work area. In addition, or in the alternative, the virtual perimeter 500 may take into account the current locations of one or more work machines 200 relative to the work area, such that if no work machines 200 are active in the work area there may be no virtual perimeter established for monitoring in subsequent steps, or that the virtual perimeter 500 is only generated within a predetermined radius or distance with respect to any one work machine 200 operating in the work area. Such features may be desirable in certain contexts wherein resources are otherwise unnecessarily spent detecting motion incidents 510 in portions of the work area that are irrelevant for activity by the work machines 200 at a given time.

The object detection stations 300 may be configured to initially operate in a low power mode (step 630) wherein an objection detection process is performed with respect to the virtual perimeter 500 for identifying a motion incident (i.e., a trigger for further processing) in step 640 based on inputs received from the sensor unit 308 (step 645). As illustrated in FIG. 2, an exemplary motion incident 514 may include a detected movement by an object 510 from a first position 512a outside of the virtual perimeter 500 to a second position 512b within the virtual perimeter 500. Such a motion incident 514 may in certain embodiments include detection of any movement within the virtual perimeter 500, without reference to a crossover of the perimeter 500. However, depending on the application such a determination may result in a significant number of false positives, and in various embodiments a motion incident 514 may require detection of movement across the perimeter 500 before the method 600 proceeds.

Once a motion incident has been detected, the object detection station 300 may transition to a full power mode in step 650 to execute more complex processing steps to classify or otherwise identify the source of the motion incident (step 660). In this manner, an object detection station 300 may be operated in a more efficient manner, wherein the stored power is selectively drawn from to perform accurate object classification only as needed based on initial sensing that is performed without requiring full power.

The object classification step 660 may in various embodiments include the selective retrieval and implementation of stored models (as represented in FIG. 3 as step 665) which effectively correlate sensor input data sets to identified objects or types of objects. Such models may for example have been developed over time for a particular object detection station 300 or associated computing system collecting inputs from a plurality of such object detection stations 300, wherein user input may be used to characterize or at least confirm correlations with input data sets, such that the station or system learns classification results and can ideally generate a classification result from a new/current input data set at a sufficiently high level of confidence that further user input/confirmation is substantially unnecessary.

Once the motion incident source 510 has been classified, the method 600 may continue in step 670 with the generation of output signals to one or more further components of the system 100, and preferably to at least one of the one or more work machines 200 operating in the work area. In an embodiment, the object detection stations 300 may be configured to perform object detection and classification steps in a low power mode even if no work machines 200 are currently in operation, wherein no high power processing functions and/or generation of output signals are performed.

In an embodiment, output signals from the object detection station 300 may be provided to a user interface 306 of a work machine 300 and/or (particularly where the work machines 200 are autonomous in nature) to a user interface 406 of a remote computing device 400, wherein associated display units may be configured to display renderings of the detected motion incident source 510, indicia corresponding to a type of the motion incident source or a distance between the motion incident source 510 and the work machine 200, a map of the work area having the relative positions of the work machine 200 and the motion incident source 510 overlaid or otherwise visually represented, and the like. In an embodiment, the user interface 206, 406, alone or in association with the relevant controller 204, 404, may be configured to display work machine operation data during a normal operation, such as for example would correspond to conventional gauges or status indicators, wherein the display unit may further be configured to change the displayed information to a camera or other such view when a motion incident 514 is detected by the object detection station 300.

In various embodiments, the work machines 200 may respond to the output signals in step 680 with selective transitioning of machine operating modes from a normal operating mode to a hierarchical intervention mode for at least one of the work machines 200 in the work area. Whether or not the transition takes place, or which stage in the hierarchy of potential interventions, may depend for example on factors 685 including a type of motion incident source 510, one or more environmental conditions affecting the ability of the respective work machine 200 to detect or otherwise respond to the motion incident source 510, a proximity between the work machine 200 and the motion incident source 510, and the like.

In one example as illustrated in step 692, a particular work machine 200 operating in the work area may be commanded to, at least temporarily, continue in a normal operating mode (or simply not commanded to take any alternative approach associated with the hierarchy of potential interventions), as the detected motion incident source is not deemed to be of sufficient risk based on analysis of at least the above-referenced parameters.

In another example as illustrated in step 694, the work machine 200 operating in the work area may be commanded (e.g., by the local controller 204) in accordance with the hierarchical intervention modes to stop operations altogether, as the detected motion incident source is deemed to be of sufficient risk based on analysis of at least the above-referenced parameters.

In another example as illustrated in step 696, the work machine 200 operating in the work area may be commanded (e.g., by the local controller 204) in accordance with the hierarchical intervention modes to continue with operations in the work area, but to reduce an advance speed, reduce an available swing radius for a corresponding work implement, or the like, as the detected motion incident source is deemed to be of sufficient risk based on analysis of at least the above-referenced parameters.

In another example as illustrated in step 698, the work machine 200 operating in the work area may be commanded (e.g., by the local controller 204) in accordance with the hierarchical intervention modes to adjust a range and/or sensitivity for a motion detection system local to the work machine 200. For example, it may be optimal (for power savings, speed of operation, etc.) for a work machine 200 to reduce the range of motion detection to a first range during standard operations, but preferred in a riskier context corresponding to the detected motion incident and more particularly corresponding to the above-referenced parameters for selective transition to expand the range of the local object detection. The work machine 200 itself may further determine based on expanded object detection that operations should be suspended 694 or slowed down 696.

The normal mode and hierarchical intervention modes 692-698 may in some embodiments include an initial response to a detect motion incident, followed by a sequence of responses corresponding to detected changes in status for the motion incident source 510, such that for example one or more components of the system 100 predict a future state of the motion incident source 510 after an initial traverse of the virtual perimeter 500, and then monitors further actual states of the motion incident source 510 with respect to the predicted state, wherein an intervention mode of various work machines 200 in the work area may be modified based, e.g., on continued movement of the motion incident source 510 relative to the work machines 200, either to reduce risk of engaging the motion incident source 510 or alternatively to revert to a normal operating mode if the motion incident source 510 does not move closer to the work machine 200 or even turns out to be a false positive.

In another example (not shown), the detection of motion incidents and/or transmissions associated with hierarchical intervention modes may be manually directed and/or selectively enabled depending on one or more local conditions. As but one illustrative example, an authorized user may be capable via one or more user interfaces as described above to specify aspects of the system that fully operate at a given time. At the beginning of a work operation, this may include a site manager initially directing the system as disclosed herein to run at full capability and verifying that the work area is sufficiently clear of objects to allow the one or more work machines to run in an autonomous/highly automated mode. The system may further detect a motion incident corresponding to exit of the site manager or authorized user from the work area, wherein appropriate adjustments may be made to the operating capabilities of the system components thereafter.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of distributed perception sensing via at least one object detection station arranged such that, for each of the at least one station, an associated one or more object detection sensors have respective fields of perception including at least a portion of a virtually defined perimeter extending at least partially about a working area having one or more working machines operating there within, the one or more working machines external to and independent of the at least one object detection station, the method comprising:

detecting, via one or more of the at least one object detection station, a motion incident corresponding to a violation of the virtually defined perimeter;

classifying a detected source of the motion incident with respect to one or more defined source types;

determining, at the one or more of the at least one object detection station, first position data for the classified source of the motion incident in a reference frame independent of the one or more working machines;

wirelessly communicating one or more signals at least corresponding to the motion incident and the first position data from the one or more of the at least one object detection station to the one or more working machines operating within the working area;

converting, at each of the one or more working machines, the first position data to second data in a reference frame associated with a local object detection system of the respective working machine, for determining a location of the detected source relative to the respective working machines; and selectively transitioning at least one of the one or more working machines from a normal operating mode to a hierarchical intervention mode with respect to one or more of the detected source and a relative position thereof within the working area, wherein the selectively transitioning comprises automatically selecting a responsive operation of adjusting a range and/or sensitivity of the local object detection system for the at least one working machine.

2. The method of claim 1, wherein one or more of the at least one object detection station is portable, and wherein the method comprises arranging the one or more of the at least one object detection station with respect to the at least a portion of the virtually defined perimeter.

3. The method of claim 1, wherein the motion incident is detected in a low-power operating mode, the method further comprising transitioning of the one or more of the at least one object detection station into a full-power operating mode for classifying the detected source of the motion incident.

4. The method of claim 1, wherein classifying a detected source of the motion incident with respect to one or more defined source types comprises:

training one or more models to correlate historical input data sets from the one or more object detection sensors with respect to user input identifying the one or more source types;

receiving a current input data set corresponding to the motion incident from the one or more object detection sensors as input to the one or more models; and comparing the current input data set with the historical input data sets via the one or more models to classify the detected source of the motion incident.

5. The method of claim 1, wherein the virtually defined perimeter is established via user input on a remote computing device and downloaded to each of the at least one object detection station.

6. The method of claim 1, wherein the virtually defined perimeter is dynamically established based on the arranging of the at least one object detection station and/or a current location of the one or more working machines.

7. The method of claim 1, wherein the selectively transitioning of at least one of the one or more working machines from a normal operating mode to a hierarchical intervention mode further comprises automatically selecting a responsive operation of causing the at least one working machine to stop, or adjusting a speed of movement of the at least one working machine.

8. The method of claim 7, wherein the responsive operation is automatically selected based on a type of the classified source of the motion incident.

9. The method of claim 7, wherein the responsive operation is automatically selected based on environmental conditions within the working area.

10. The method of claim 7, wherein the responsive operation is automatically selected based on a proximity between the detected source of the motion incident and the at least one working machine.

11. A system comprising:
at least one object detection station each comprising a power source, a wireless communication transceiver, and one or more object detection sensors, and arranged such that the one or more object detection sensors have respective fields of perception including at least a portion of a virtually defined perimeter extending at least partially about a working area;
at least one controller for each of one or more working machines operating within the working area, the one or more working machines being external to and independent of the at least one object detection station and in functional communication with each of the at least one object detection station;
wherein each of the at least one object detection station is configured to
detect a motion incident corresponding to a violation of the virtually defined perimeter,
classify a detected source of the motion incident with respect to one or more defined source types,
determine first position data for the classified source of the motion incident in a reference frame independent of the one or more working machines, and
wirelessly communicate one or more signals at least corresponding to the motion incident and the first position data to the one or more working machines operating within the working area;
wherein each of the at least one controller is configured responsive to the one or more signals to
convert the first position data to second data in a reference frame associated with a local object detection system of the respective working machine, for determining a location of the detected source relative to the respective working machines, and
selectively transition the respective working machine from a normal operating mode to a hierarchical intervention mode with respect to one or more of the detected source and a relative position thereof within the working area, wherein the selectively transitioning comprises automatically selecting a responsive operation of adjusting a range and/or sensitivity of a local object detection system for the at least one working machine.

12. The system of claim 11, comprising a plurality of object detection stations each in functional communication with the one or more working machines and with each other object detection station.

13. The system of claim 11, wherein the motion incident is detected in a low-power operating mode, and the at least one object detection station is further configured to transition into a full-power operating mode for classifying the detected source of the motion incident.

14. The system of claim 11, wherein the virtually defined perimeter is established via user input on a remote computing device and downloaded to each of the at least one object detection station.

15. The system of claim 11, wherein the virtually defined perimeter is dynamically established based on the arranging of the at least one object detection station and/or a current location of the one or more working machines.

16. The system of claim 11, wherein the selectively transitioning of at least one of the one or more working machines from a normal operating mode to a hierarchical intervention mode further comprises automatically selecting a responsive operation of causing the at least one working machine to stop, or adjusting a speed of movement of the at least one working machine.

17. The system of claim 16, wherein the responsive operation is automatically selected based on a type of the detected source of the motion incident.

18. The system of claim 16, wherein the responsive operation is automatically selected based on environmental conditions within the working area, and/or based on a proximity between the detected source of the motion incident and the at least one working machine.

* * * * *